Figure 1:
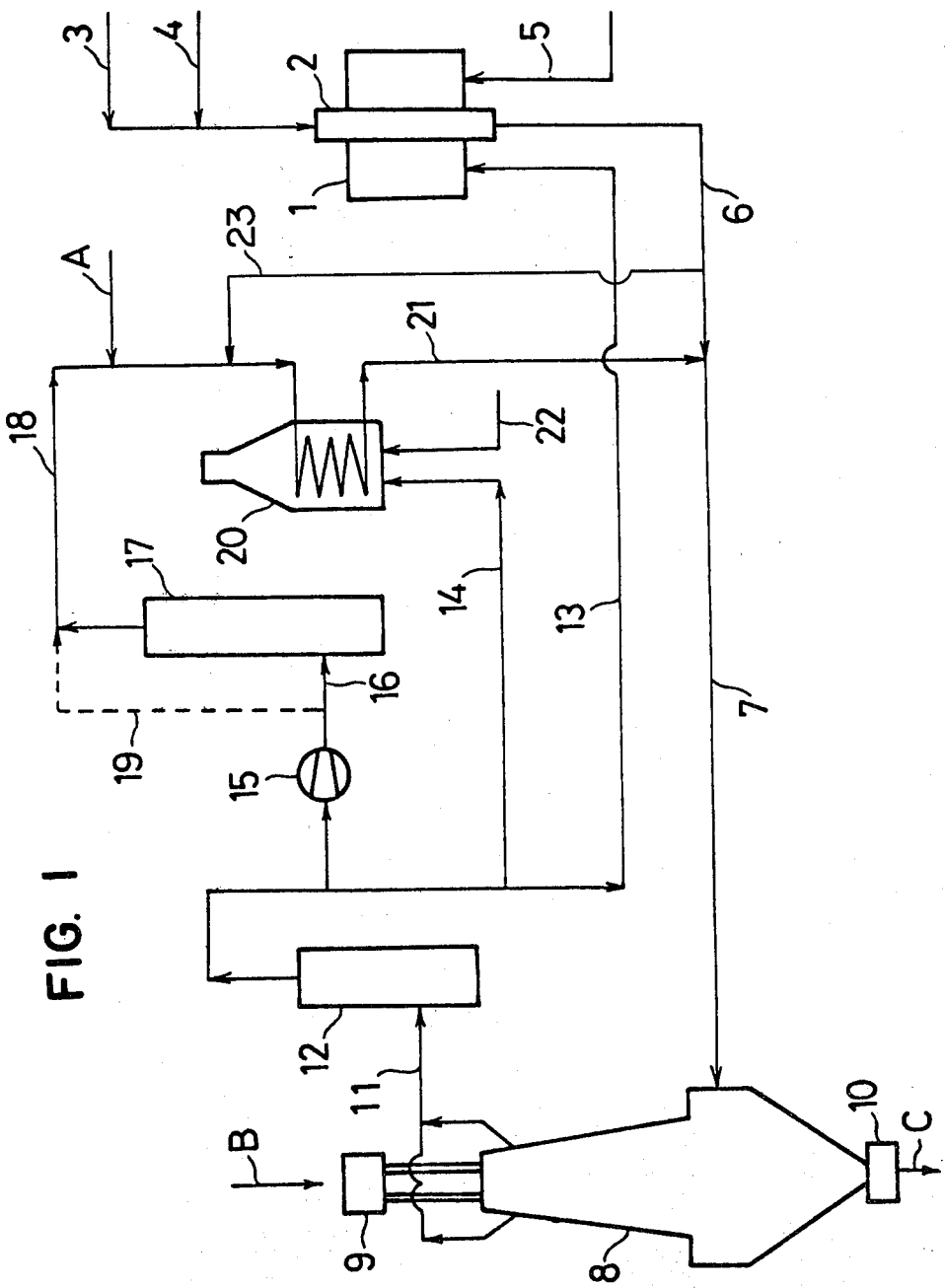

United States Patent [19]

Ohtawa et al.

[11] 4,376,648
[45] Mar. 15, 1983

[54] PROCESS FOR PRODUCING REDUCED IRON

[75] Inventors: Kimiaki Ohtawa; Masahiro Tokuda; Yasuo Fukada, all of Hiroshima, Japan

[73] Assignee: Mitsubishi Jukogyo Kabushiki Kaisha, Tokyo, Japan

[21] Appl. No.: 259,058

[22] Filed: Apr. 30, 1981

[30] Foreign Application Priority Data

Dec. 4, 1980 [JP] Japan ............................. 55-170226

[51] Int. Cl.$^3$ ........................................ C21B 13/02
[52] U.S. Cl. ..................................... 75/35; 266/156
[58] Field of Search ................................... 75/33–38; 266/156

[56] References Cited

U.S. PATENT DOCUMENTS 4,213,777 7/1980 Grebe et al. ............................. 75/34
4,298,190 11/1981 MacKay ................................. 75/35

Primary Examiner—M. J. Andrews
Attorney, Agent, or Firm—Wenderoth, Lind & Ponack

[57] ABSTRACT

In a direct reduction plant employing a shaft furnace for reducing iron ore and a steam reformer for producing a reducing gas from gaseous hydrocarbon compounds and provided with an installation for heating at least a part of the reducing gas to be supplied to said shaft furnace, either hydrogen sulfide or a material adapted to produce hydrogen sulfide within the reducing gas is added to the reducing gas system from outside of the system so that the concentration of hydrogen sulfide in the reducing gas at the inlet of said shaft furnace is 10 to 100 volume ppm.

2 Claims, 2 Drawing Figures

PROCESS FOR PRODUCING REDUCED IRON

The present invention relates to a process for producing reduced iron by bringing iron ore into contact with a reducing gas within a shaft furnace, and more particularly, to a process for producing reduced iron in a direct reduction plant employing a shaft furnace for reducing iron ore by bringing iron ore into contact with a reducing gas and a steam reformer for producing a reducing gas from gaseous hydrocarbon compounds and provided with means for heating a part or all of the reducing gas to be supplied to the shaft furnace.

In such a process for producing reduced iron, enhancement of production speed of reduced iron per unit volume of a shaft furnace (hereinafter called "productivity of a shaft furnace") and reduction of the amount of reducing gas necessary for producing a unit amount of reduced iron (hereinafter called "gas utilization rate") are goals set by those skilled in the art because they are important factors in deciding the economy of a direct reduction plant.

In general, productivity and gas utilization rate of a shaft furnace are improved as the operation temperature and operation pressure of the shaft furnace are raised. Normally, an industrially employed operation temperature of a shaft furnace is 750° C. to 900° C. in terms of the temperature of the gas supplied to the shaft furnace, and the operation pressure of the shaft furnace is 1 atm. to 4 atm. at the top portion of the shaft furnace.

However, a permissible operation temperature of a shaft furnace depends upon the tackifying temperature of iron ore to be treated. If iron ore having a low tackifying temperature is treated at a temperature higher than its tackifying temperature, then the iron ore being treated will combine together into clusters, and in the event that the formation of clusters is great, normal operation of the shaft furnace would become impossible.

On the other hand, the operation pressure of a shaft furnace is restricted due to a problem in an installation technique that if the operation pressure is raised, it becomes necessary to increase the anti-pressure strength of the shaft furnace and other relevant installations and it becomes difficult to prevent the reducing gas from leaking out of the system through the device for charging iron ore into the shaft furnace and the device for discharging iron ore from the shaft furnace. In addition, as the operation pressure is raised, separation of carbon from the reducing gas within the shaft furnace would become remarkable. Therefore, the operation pressure cannot be increased beyond a certain extent.

Besides an operation temperature and an operation pressure, the operation parameters concerned with the productivity and gas utilization rate of a shaft furnace include the reducing gas composition. The composition of a reducing gas normally consists of hydrogen ($H_2$) and carbon monoxide (CO) as its principal components, and a small amount of steam ($H_2O$), carbonic acid gas ($CO_2$), methane ($CH_4$) and nitrogen ($N_2$).

A reducing gas comes into contact with iron ore within a shaft furnace and reduces iron ore, for example, through the following reactions:

$Fe_2O_3 + 3H_2 = 2Fe + 3H_2O$ $Fe_2O_3 + 3CO = 2Fe + 3CO_2$

More particularly, iron ore is reduced by $H_2$ and CO in a reducing gas into reduced iron, and simultaneously therewith $H_2O$ and $CO_2$ are produced, respectively. Therefore, if concentrations of $H_2$ and CO in a reducing gas are selected as high as possible and concentrations of $H_2O$ and $CO_2$ are selected as low as possible, then the reduction speed of iron ore can be maximized, and a large amount of iron ore can be reduced with a small amount of reducing gas. This means that the higher the concentrations of $H_2$ and CO in the reducing gas, and the lower the concentrations of $H_2O$ and $CO_2$ therein, the more the productivity and gas utilization rate of the shaft furnace can be improved.

However, in the case where a shaft furnace is operated with a reducing gas having high concentrations of $H_2$ and CO therein and low concentrations of $H_2O$ and $CO_2$ therein, one would encounter the difficulty that separation of carbon within the shaft furnace becomes remarkable. In the event that carbon separation within a shaft furnace occurs in a large amount, the flow resistance for a reducing gas within the shaft furnace is increased, and consequently it becomes necessary to increase the supply power of the reducing gas to the shaft furnace as well as increase the inner pressure within the shaft furnace, and sometimes normal operation of the shaft furnace becomes impossible.

The carbon separation within a shaft furnace is considered to be principally caused by the following Boudonard reaction:

$2CO = C + CO_2$

Therefore, as the concentrations of $CO_2$ and $H_2O$ in a reducing gas (hereinafter called "degree of oxidation") are lowered, the carbon separation is greatly increased, and within a normal operation temperature range of a shaft furnace of 750° C. to 900° C., the lower the temperature is and the higher the operating pressure is, the greater the carbon separation. As will be apparent from the above reaction formula, increase of carbon separation will result in wasteful consumption of reducing gas and an increase in the degree of oxidation in the reducing gas.

Consequently, in the case of subjecting iron ore having an especially low tackifying temperature to direct reduction treatment, it has been a current practice that only an operation with a reducing gas having a high degree of oxidation, that is, only an uneconomical operation sacrificing productivity and utilization rate of the reducing furnace, can be carried out.

It is therefore one object of the present invention to provide a process for producing reduced iron, which entirely obviates the problems in the prior art that in order to suppress carbon separation within a shaft furnace, operation with a reducing gas having a high degree of oxidation was carried out and hence productivity and gas utilization rate of the shaft furnace were sacrificed, and which makes it possible to produce reduced iron at a high efficiency with a reducing gas having a low degree of oxidation without being accompanied by the problem of carbon separation within the shaft furnace.

According to one feature of the present invention, there is provided a process for producing a reduced iron in a direct reduction plant employing a shaft furnace as a reducing furnace and a steam reformer for producing a reducing gas from gaseous hydrocarbon compounds and provided with an installation for heating a part or all of the reducing gas to be supplied to said shaft furnace, in which process either $H_2S$ or a material adapted to produce $H_2S$ within the reducing gas is additionally supplied into the reducing gas system from outside of the system so that the concentration of hydrogen sulfide ($H_2S$) in the reducing gas at the inlet of said shaft furnace may become 10 volume ppm to 100 volume ppm, and preferably it is additionally supplied into the reducing gas before said reducing gas is heated in said heating installation.

When the above-featured process for producing reduced iron is practiced, the productivity and gas utilization rate of the shaft furnace, which determine the economy of a direct reducing plant, can be improved, and carbon separation within the shaft furnace as well as carbon separation within the reducing gas heating installation, which made operation of a direct reducing plant difficult, can be suppressed.

Figure 2:
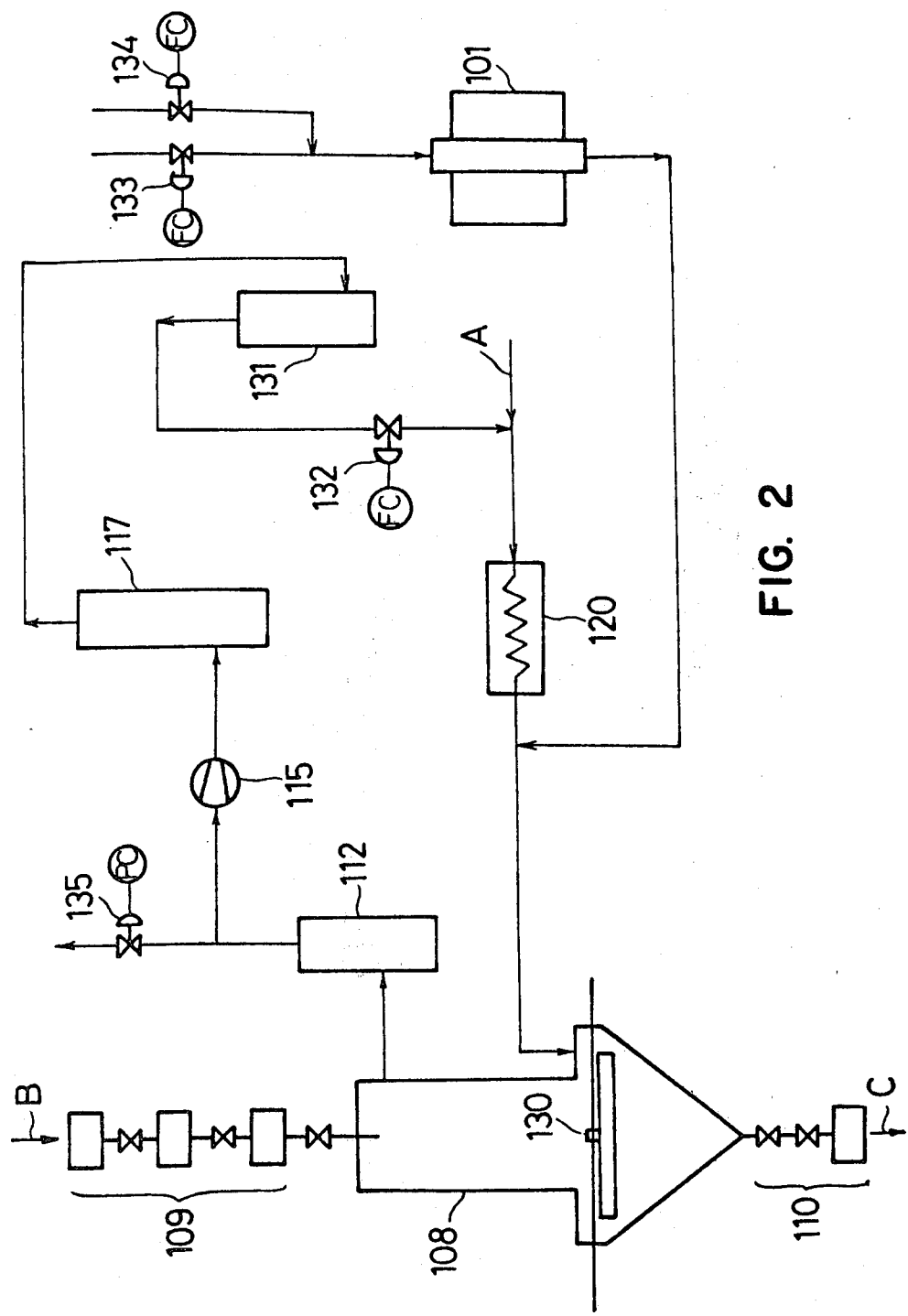

The above-mentioned and other objects, features and advantages of the present invention will become more apparent by reference to the following description of a preferred embodiment of the invention taken in conjunction with the accompanying drawings, wherein:

FIG. 1 is a system diagram to be used for explaining one preferred embodiment of the process according to the present invention as compared to a process in the prior art, and FIG. 2 is a system diagram of a test plant which was used in one example of an experimental process of the present invention.

At first, reference is made to the system diagram of a direct reduction plant in FIG. 1 for explaining one mode of the process according to the present invention in comparison to a process in the prior art.

In FIG. 1, reference numeral 1 designates a steam reformer for producing a reducing gas, which has been widely used in the chemical industry. Within the steam reformer 1 is a reforming tube 2 which is filled with catalyst for reforming gaseous hydrocarbon compounds. A hydrocarbon raw material supplied through a hydrocarbon raw material supply tube 3 is mixed with steam supplied through a steam supply tube 4 and then introduced into the reforming tube 2, in which the hydrocarbon raw material reacts with steam and becomes a reducing gas.

In addition, since carbonic acid gas ($CO_2$) reacts with a hydrocarbon raw material to produce a reducing gas, it can be used as a substitute for a part of the steam supplied from the steam supply tube 4 to the reforming tube 2, and so, it could be supplied to the reforming tube 2 jointly with a hydrocarbon raw material and steam.

Heat necessitated for reforming is supplemented by burning a fuel supplied through a fuel supply tube 5 and, if necessary, a part of a furnace gas supplied through a conduit 13.

A reducing gas produced by the steam reformer 1 is passed through a conduit 6, and after it has been mixed with a regenerated reducing gas circulated through a conduit 21, it is supplied to a shaft furnace 8 through a conduit 7.

The reducing gas supplied to the shaft furnace 8 makes antiparallel flow contact with iron ore supplied from a line B through an ore feeder 9 and flowing down through the shaft furnace 8, and thus reduces the iron ore. More particularly, a part of $H_2$ and CO in the reducing gas reduces the iron ore and becomes $H_2O$ and $CO_2$. The reducing gas, after it has reduced iron ore, is passed through a furnace gas extracting tube 11 as a furnace gas, and introduced into a scrubber 12.

In addition, iron ore reduced by the reducing gas is taken out externally by a product discharging device 10 through a line C.

The furnace gas introduced into the scrubber 12 is rinsed by water within the scrubber 12, and thereby most of the pulverized dust such as fine powder of iron ore and steam contained in the furnace gas is removed. A part of the furnace gas outgoing from the scrubber 12 is supplied through a conduit 16 to a $CO_2$ remover 17 by a gas circulation compressor 15 in order to be reused as a reducing gas, and most of the acidic gases such as carbonic acid gas ($CO_2$) and hydrogen sulfide ($H_2S$) contained in the furnace gas is removed by the $CO_2$ remover 17. In the $CO_2$ remover 17, an MEA process employing an aqueous solution of monoethanol amine as an absorbent liquid and a Benfield process employing a mixed aqueous solution of $K_2CO_3$ and diethanol amine as an absorbent liquid, which have been industrially widely used, can be practiced. The furnace gas having acidic gases such as $CO_2$, $H_2S$, etc. removed by the $CO_2$ remover 17 is supplied as a regenerated reducing gas through a conduit 18 into a reducing gas heating furnace 20. The regenerated reducing gas is heated in the reducing gas heating furnace 20 by combustion heat of a fuel supplied through a fuel supply tube 22 and a part of a furnace gas supplied through a conduit 14, then extracted through a conduit 21, and supplied to the shaft furnace 8 jointly with a reducing gas supplied from the steam reformer 1 through the conduit 6.

In the above-described direct reduction plant, as described previously, in order to prevent separation of carbon within the shaft furnace 8, heretofore, it was necessary to adjust the degree of oxidation in the reducing gas supplied to the shaft furnace 8, and the adjustment of the degree of oxidation was effected by directly circulating a part of the furnace gas into the reducing gas through a by-path tube 19, thus by-passing the $CO_2$ remover 17, or by directly blasting steam or carbonic acid gas into the reducing gas. It has been already described above that raising the degree of oxidation in the reducing gas in this way would sacrifice the productivity and gas utilization rate of the shaft furnace 8.

In this connection, as a method for suppressing separation of carbon on the heating tube wall, heretofore in a direct reduction plant employing a reducing gas obtained by treating a raw material of hydrocarbon compounds containing a sulfur content such as, for example, heavy oil through a partial oxidation process, a method for suppressing separation of carbon by making the reducing gas contain a certain amount of sulfur content by varying the sulfur content removing rate in a desulfurizing installation provided for removing the sulfur content in the reducing gas, has been known as proposed, for instance, in Japanese Patent Publication No. 54-40203.

In this method, the sulfur content concentration in the reducing gas is adjusted by varying the sulfur content removing rate in the desulfurizing installation by changing the amount of a rinsing liquid or residence time in the desulfurizing installation, and hence, according to this method, the removing rate of acidic gases such as carbonic acid gas to be essentially removed would be also varied in accordance with the removing rate of the sulfur content in the desulfurizing installation. In other words, if a reducing gas is made to contain a sulfur content through this method, then the degree of oxidation in the reducing gas would be naturally enhanced, and therefore, this method is contrary to one of the objects of the present invention of enhancing the productivity and gas utilization rate of a shaft furnace.

On the other hand, in a direct reduction plant employing a steam reformer, as will be described later it is impossible to derive the sulfur content for the reducing gas from the raw material hydrocarbon gas.

Therefore, according to the present invention it is intended to enhance the productivity and gas utilization rate of a shaft furnace and also suppress separation of carbon within a reducing furnace by introducing a sulfur content into the reducing gas system from outside of the system without raising the degree of oxidation in the reducing gas at all, and preferably it is also intended to simultaneously suppress separation of carbon on the heating tube wall in a heating furnace by selecting the position where the sulfur content is introduced from outside of the system at a position upstream of the heating furnace for the reducing gas.

More particularly, according to the present invention a reducing gas having a low degree of oxidation is employed, $H_2S$ or a material adapted to produce $H_2S$ in the reducing gas is introduced into the reducing gas from outside of the reducing gas system, and thereby $H_2S$ caused to be contained in the reducing gas blasted into a shaft furnace at a concentration of 10 volume ppm or more, preferably 10 volume ppm to 100 volume ppm. As a result, a reducing operation of iron ore can be achieved without being accompanied by any problem caused by separation of carbon, by making use of a reducing gas having a low degree of oxidation which could not be used in the prior art because of remarkable separation of carbon within the shaft furnace, and moreover, a reducing speed of iron ore can be greatly enhanced. In this case, if $H_2S$ or a $H_2S$-producing material is contained in the reducing gas before the reducing gas is heated in a reducing gas heating furnace, and more particularly, before the reducing gas is heated in a reducing gas heating furnace and the reducing gas temperature reaches 500° C., then separation of carbon on the reducing gas heating tube wall, which brought about a problem upon heating a reducing gas in the prior art, also can be suppressed. (It is to be noted that upon heating up to a temperature of 500° C. or lower, little separation of carbon will occur.)

Explaining now with reference to FIG. 1, by introducing either $H_2S$ or a material which can easily produce $H_2S$ within a reducing gas atmosphere such as $CS_2$, $(NH_4)_2S$, etc. into a reducing gas, for instance, through an introduction tube A, so that the $H_2S$ concentration in the reducing gas at the inlet of shaft furnace 8 may become 10 volume ppm or more, preferably 10 volume ppm to 100 volume ppm, the following advantages can be realized:

(1) a reducing operation of iron ore by making use of a reducing gas having a low degree of oxidation, which was heretofore considered to be unavailable due to the problem of carbon separation, becomes available, and thereby the productivity and gas utilization rate of shaft furnace 8 can be greatly enhanced; and (2) separation of carbon on the heating tube wall in the reducing gas heating furnace 20 can be suppressed.

The reasons why $H_2S$ or a sulfur-containing material such as $CS_2$, $(NH_4)_2S$, etc. is introduced into the reducing gas system from outside of the system as a method for causing $H_2S$ to be contained in the reducing gas, will not be explained. In view of the fact that, in the steam reformer 1 to be used as a reducing gas production installation, a reforming catalyst would be poisoned by a sulfur content and its activity would be lowered, resulting in serious trouble in the production of a reducing gas, normally a permissible sulfur content concentration in the raw materials gas for the reducing gas is limited to about 10 volume ppm or less therefore, it is substantially impossible to achieve the object of the present invention by causing a sulfur content to be contained in the hydrocarbon raw material. Also, if the $H_2S$ produced upon reduction of iron ore by the reaction between a sulfur content in the iron ore and $H_2$ in the reducing gas is utilized, then it becomes necessary to circulate a part of the furnace gas in the reducing gas by by-passing the $CO_2$ remover 17, since the produced $H_2S$ would otherwise be removed jointly with $CO_2$ in the $CO_2$ remover 17, and this would necessarily raise the degree of oxidation in the reducing gas similarly to the method disclosed in the above-mentioned Japanese Patent Publication No. 54-40203, and therefore, it becomes impossible to achieve the object of the present invention.

Indeed, heretofore in a direct reduction plant employing a steam reformer as a reducing gas production installation, an effort has been made to minimize the sulfur content in the reducing gas as much as possible for the purpose of preventing a reforming catalyst from being poisoned and preventing degradation in the quality of the product caused by an increase of the sulfur content concentration in the reduced iron product.

However, in the method according to the present invention, a reforming catalyst would not be poisoned by a sulfur content at all, and if the $H_2S$ concentration in the reducing gas is suppressed to 100 volume ppm or less, the sulfur content concentration in the reduced iron product would not be substantially increased. To increase the $H_2S$ concentration in the reducing gas to 100 volume ppm or more involves a risk of raising the sulfur content concentration in the reduced iron product. Also, unnecessarily increasing the $H_2S$ concentration would result in an increase in the amount of the sulfur-containing material to be introduced into the reducing gas system. Therefore, an amount above 100 volume ppm is not favorable from an economical viewpoint.

In addition, if the sulfur-containing material is introduced into the reducing gas system through a conduit A before the reducing gas is heated in the heating installation 20 and the reducing gas temperature reaches about 500° C. as illustrated in FIG. 1, then besides the above-mentioned effects, a carbon separation suppression effect on the heating tube wall surface in the reducing gas heating installation 20 can be also achieved as described previously.

As will be apparent from the above description, according to the present invention, it is desirable to lead all the furnace gas passed through the gas circulation compressor 15 to the $CO_2$ remover 17 to substantially completely remove $CO_2$ in the furnace gas. Accordingly, the heretofore used by-path tube 19 becomes unnecessary.

The sulfur-containing material to be introduced into the reducing gas system for the purpose of adjusting the $H_2S$ concentration in the reducing gas could be $H_2S$ itself which can be easily obtained industrially and is easy to handle, or any other material which can easily produce $H_2S$ within a reducing gas atmosphere, and for such materials, $CS_2$ and $(NH_4)_2S$ which can be easily obtained industrially and are easy to handle, will be suitable.

The process according to the present invention can be applied to the following plant, besides the direct reduction plant having a flow as discussed above.

For instance, the process according to the present invention is applicable to a direct reduction plant constructed in such manner that in the flow shown in FIG. 1, after the reducing gas has been once cooled to remove most of the moisture contained in the reducing gas at the outlet of the steam reformer 1 by providing a condenser in the reducing gas line 6 at the outlet of the steam reformer 1, the reducing gas is fed through line 23 and is again heated by the heating furnace 20 and then supplied to the shaft furnace 8. Alternatively, the direct reduction plant can be constructed in such manner that the reducing gas is once cooled to remove most of a moisture contained in the reducing gas by providing a condenser at the outlet of the steam reformer 1, thereafter the reducing gas is fed through line 23 and is heated in the heating furnace 20 jointly with the regenerated reducing gas circulated through the tube 18, and then it is supplied to the shaft furnace 8.

Experimental production of reduced iron by means of a small-sized test installation has been carried out for the purpose of industrialization of the direct reduction plant illustrated in FIG. 1.

A system diagram of the installation used in the experiments is shown in FIG. 2.

In the experiments, a rectangular shaft furnace 108 having a charging volume of iron ore of about 125 l was used, discharge of reduced iron in the shaft furnace 108 was effected from a reducing zone of the shaft furnace 108 by reciprocating a shuffle bar 130, and iron ore was supplied from a line B into the shaft furnace 108 by means of an ore feeder 109 in accordance with the discharging rate of reduced iron.

After the furnace gas has been rinsed by water in a water rinse tower 112, a part of the furnace gas is introduced into a monoethanol amine cleaning tower 117 by means of a constant volume gas compressor 115 to remove most of the acidic gas in the furnace gas, and thereafter, the furnace gas in introduced into a water bath 131 regulated at a constant pressure and at a constant temperature to adjust the moisture concentration in the reducing gas.

In addition, $CH_4$ gas having its flow rate regulated at a predetermined rate by a flow rate regulator 133, and steam having its flow rate regulated at a predetermined rate by a flow rate regulator 134, are introduced into a steam reformer 101 to produce a reducing gas, which is introduced into the outlet of an electric furnace 120, and then they are supplied to the shaft furnace 108 along with regenerated reducing gas heated by the electric furnace 120.

The pressure within the water bath 131 was regulated by a pressure regulator 132, and an operating pressure in the shaft furnace was regulated by a pressure regulator 135 so as to maintain the pressure within the water rinse tower 112 constant.

The following iron ore was used:

| iron ore: | produced in Sweden (trade name: MPR pellets) | |
|---|---|---|
| ore composition: | total iron concentration | 67.9 weight % |
| | FeO concentration | 1.1 weight % |
| | total matrix concentration | 2.82 weight % |
| | sulfur content concentration | 0.007 weight % |
| | phosphorus content concentration | 0.015 weight % |
| | bonding water concentration | 0.17 weight % |
| ore grain size: | spherical pellets smaller than 31.5 mm and larger in size according to sieve analysis | |

Experiment 1

An experiment was conducted according to a process similar to the heretofore known process, in which merely the degree of oxidation in the reducing gas was raised without introducing a sulfur content into the reducing gas blasted into a shaft furnace 108. The experimental conditions and results were as follows:

| | | |
|---|---|---|
| reducing gas temperature: 802° C. ~ 806° C. | | |
| shaft furnace operating pressure: 1.45 atm. ~ 1.5 atm. | | |
| reducing gas composition: | $H_2$ | 50.0 vol. % |
| | CO | 35.9 vol. % |
| | $CO_2$ | 2.8 vol. % |
| | $H_2O$ | 9.4 vol. % |
| | $CH_4$ | 1.9 vol. % |
| amount of used reducing gas: | | 2.280 N $m^3$/t reduced iron |
| productivity of shaft furnace: | | 4.5 t reduced iron/$m^3$ d |
| reduced iron product composition: | | metallic proportion 92.28% sulfur content concentration 0.006% |
| pressure loss in shaft furnace: | | 810 mm $H_2O$/m ~ 835 mm $H_2O$/m |

After completion of the experiment, heating tubes of electric furnace 120 used as a heating furnace for the reducing gas were opened and inspected, and as a result, it was observed that a small amount of carbon was deposited on the heating tube wall surfaces.

Experiment 2

An experiment was conducted according to the heretofore known process, in which the degree of oxidation in the reducing gas was low without adding a sulfur content into a reducing gas. The experimental conditions were as follows:

| | | |
|---|---|---|
| reducing gas temperature: 803° C. ~ 805° C. | | |
| shaft furnace operating pressure: 1.45 atm. ~ 1.5 atm. | | |
| reducing gas composition: | $H_2$ | 53.8 vol. % |
| | CO | 40.4 vol. % |
| | $CO_2$ | 0.5 vol. % |
| | $H_2O$ | 3.2 vol. % |
| | $CH_4$ | 2.1 vol. % |

In the experiment under the above conditions, several hours after the commencement of the experiment the pressure at the inlet of the shaft furnace 108 became high, also scaffolding or iron ore arose within the shaft furnace, and charging of iron ore into the shaft furnace became impossible. In addition, a considerable amount of carbon was deposited on the heating tube wall surfaces of the reducing gas heating furnace 120.

Experiment 3

An experiment was conducted in which $H_2$ S was injected from line A into the inlet of the electric furnace 120 used as a heating furnace for the reducing gas in order to confirm the effects of the process according to the present invention. The experimental conditions and results were as follows:

| | | |
|---|---|---|
| reducing gas temperature: | 801° C. ~ 807° C. | |
| shaft furnace operating pressure: | 1.45 atm. ~ 1.5 atm. | |
| reducing gas composition: | $H_2$ | 56.7 vol. % |
| | CO | 38.5 vol. % |
| | $CO_2$ | 0.7 vol. % |
| | $H_2O$ | 2.6 vol. % |
| | $CH_4$ | 1.5 vol. % |
| | $H_2S$ | 10.5 vol. ppm |
| amount of used reducing gas: | 1.970 N $m^3$/t reduced iron | |
| productivity of shaft furnace: | 6.8 t reduced iron/$m^3$ d | |
| reduced iron product composition: | metallic proportion 91.6% sulfur content concentration 0.006% | |
| pressure loss in shaft furnace: | 625 ~ 630 mm $H_2O$/m | |

It was observed that only a small amount of carbon was deposited on the tube walls of the reducing gas heating furnace 120.

Experiment 4

| | | |
|---|---|---|
| reducing gas temperature: | 804° C. ~ 806° C. | |
| shaft furnace operating pressure: | 1.45 atm. ~ 1.5 atm. | |
| reducing gas composition: | $H_2$ | 56.3 vol. % |
| | CO | 39.0 vol. % |
| | $CO_2$ | 0.6 vol. % |
| | $H_2O$ | 2.5 vol. % |
| | $CH_4$ | 1.6 vol. % |
| | $H_2S$ | 97 vol. ppm |
| amount of used reducing gas: | 2.130 N $m^3$/t reduced iron | |
| productivity of shaft furnace: | 7.4 t reduced iron/$m^3$ d | |
| reduced iron product composition: | metallic proportion 92.1% sulfur content concentration 0.007% | |
| pressure loss in shaft furnace: | 632 ~ 641 mm $H_2O$/m | |

Deposition of carbon on the tube walls of the reducing gas heating furnace 120 was almost nonexistent.

As will be apparent from the above experiments, according to the process of the present invention, the amount of reducing gas necessitated for producing a unit amount of reduced iron can be reduced (enhancement of gas utilization rate), the amount of reduced iron produced per unit volume of the shaft furnace can be increased (improvement in productivity of the shaft furnace), and in addition, the pressure loss in the shaft furnace is reduced, resulting in reduction of carbon separation within the shaft furnace. Moreover, carbon separation on heating tube wall surfaces in the reducing gas heating furnace also can be suppressed.

While the principle of the present invention has been described above in connection with preferred embodiments thereof, it should be understood that all matter contained in the above description and shown in the accompanying drawings were given as illustrative and not as a limitation on the scope of the invention.

What is claimed is:

1. A process for producing reduced iron from iron ore by means of a reducing gas in a direct reduction plant including a shaft furnace which produces a furnace gas, a steam reformer and a reducing gas heating means, comprising the steps of:

producing a reducing gas from a gaseous hydrocarbon compound in said steam reformer, heating, in said reducing gas heating means, at least a portion of said reducing gas from said steam reformer and/or at least a portion of said furnace gas after said portion of said furnace gas has been regenerated into a reducing gas, supplying said reducing gas, including said heated portion or portions, to said shaft furnace, supplying hydrogen sulfide or a material capable of producing hydrogen sulfide to said reducing gas from outside the system in an amount such that the concentration of hydrogen sulfide in said reducing gas as introduced into said shaft furnace is from 10 to 100 volume ppm, and reducing said iron ore in said shaft furnace.

2. A process according to claim 1, wherein said hydrogen sulfide or material capable of producing hydrogen sulfide is added to said reducing gas to be heated in said reducing gas heating means, prior to said heating.

* * * * *